(12) United States Patent
Gecim

(10) Patent No.: US 11,946,511 B2
(45) Date of Patent: Apr. 2, 2024

(54) RAMP-ON-RAMP OVERRIDING CLUTCH ARRANGEMENT

(71) Applicant: Allison Transmission, Inc., Indianapolis, IN (US)

(72) Inventor: Burak A. Gecim, Indianapolis, IN (US)

(73) Assignee: Allison Transmission, Inc., Indianapolis, IN (US)

( * ) Notice: Subject to any disclaimer, the term of this patent is extended or adjusted under 35 U.S.C. 154(b) by 0 days.

(21) Appl. No.: 18/106,673

(22) Filed: Feb. 7, 2023

(65) Prior Publication Data

US 2023/0184295 A1 Jun. 15, 2023

Related U.S. Application Data

(63) Continuation of application No. 16/887,132, filed on May 29, 2020, now Pat. No. 11,572,923.

(60) Provisional application No. 62/861,457, filed on Jun. 14, 2019.

(51) Int. Cl.
| | |
|---|---|
| *F16D 1/112* | (2006.01) |
| *F16H 3/091* | (2006.01) |
| *F16H 59/02* | (2006.01) |

(52) U.S. Cl.
CPC ............ *F16D 1/112* (2013.01); *F16H 3/0915* (2013.01); *F16H 59/02* (2013.01)

(58) Field of Classification Search
CPC .......... F16D 1/112; F16D 21/04; F16D 11/10; F16D 2011/008; F16H 3/0915; F16H 59/02; F16H 2200/0034; F16H 2200/0043; F16H 3/089; F16H 2063/3093
See application file for complete search history.

(56) References Cited

U.S. PATENT DOCUMENTS

| | | | | |
|---|---|---|---|---|
| 1,163,085 | A | * | 12/1915 | Hardy .................... F16D 11/10 192/108 |
| 1,352,293 | A | * | 9/1920 | Lovell ................ F16H 61/0293 192/108 |
| 1,907,619 | A | * | 5/1933 | Soden-Fraunhofen ..................... F16D 11/10 192/48.91 |
| 4,096,932 | A | * | 6/1978 | Liberty, Jr. ............. F16D 23/00 192/48.91 |
| 4,098,380 | A | * | 7/1978 | Thomas .................. F16D 21/04 192/48.91 |
| 10,619,708 | B2 | * | 4/2020 | Thompson ............. F16H 63/30 |
| 10,788,125 | B2 | * | 9/2020 | Takeuchi ................ F16D 11/10 |
| 11,078,967 | B2 | * | 8/2021 | Yanagida ............. F16H 63/304 |
| 11,162,545 | B2 | * | 11/2021 | Bauduin ................... F02C 7/36 |
| 11,572,923 | B2 | | 2/2023 | Gecim |
| 2017/0234408 | A1 | * | 8/2017 | Thompson ............. F16H 63/30 74/337 |

* cited by examiner

*Primary Examiner* — Victor L MacArthur
(74) *Attorney, Agent, or Firm* — Barnes & Thornburg, LLP

(57) ABSTRACT

A clutch arrangement having a first coupler mounted for rotation with a first input gear, a second coupler mounted for rotation with a second input gear, and an input-gear selector mounted for rotation with an input shaft and positioned between the first and second couplers. The input-gear selector is movable on the input shaft relative to the first and second couplers. Engagement of the input-gear selector with the first coupler drives rotation of the first input gear with rotation of the input shaft, and engagement of the input-gear selector with the second coupler drives rotation of the second input gear with rotation of the input shaft.

20 Claims, 10 Drawing Sheets

RAMP-ON-RAMP OVERRIDING CLUTCH ARRANGEMENT

CROSS-REFERENCE TO RELATED APPLICATIONS

This application is a continuation application of U.S. application Ser. No. 16/887,132, entitled "RAMP-ON-RAMP OVERRIDING CLUTCH ARRANGEMENT," which was filed on May 29, 2020, and which issued as U.S. Pat. No. 11,572,923 on Feb. 7, 2023, and which claims the benefit of priority under 35 U.S.C. § 119(e) to U.S. Provisional Patent Application No. 62/861,457, filed Jun. 14, 2019, the entire disclosure of each of which is hereby incorporated by reference.

TECHNICAL BACKGROUND

The present disclosure relates, generally, to gear selectors for use in transmissions and, more specifically, to devices, systems, and methods for using a dog clutch for gear selection in a transmission.

BACKGROUND

A dog clutch is a type of clutch used to couple or lock two components together to transfer rotational power from a driving component to a driven component. For example, dog clutches are often used to couple or lock a driving shaft to a driven shaft, to couple or lock a driving shaft to a gear, and/or to engage one or more torque-transmitting clutches with one or more gears to transfer rotational power from the clutches to the corresponding gears.

Dog clutches are used in many different applications including transmissions of motor vehicles. In general, the transmission of a motor vehicle includes a number of selectively engageable clutches. Selective engagement and/or disengagement of the clutches establishes speed or gear ratios between the transmission input shaft and the transmission output shaft. In particular, shifting from a currently established gear ratio to a new gear ratio generally requires disengaging a clutch (i.e., the "off-going clutch") associated with the current gear ratio and engaging a clutch (i.e., the "on-coming clutch") associated with the desired new gear ratio.

SUMMARY

According to an aspect of the present disclosure, a transmission may include an input shaft, an output shaft spaced apart from the input shaft, and a clutch arrangement. The input shaft may be arranged for rotation about an axis. A first input gear and a second input gear may be coupled to the input shaft for rotation relative to the input shaft about the axis. First and second output gears may be coupled to the output shaft and each engaged with a respective one of the first or second input gears. The clutch arrangement may include a first coupler, a second coupler, and an input-gear selector. The first coupler may be mounted for rotation with the first input gear and include an outer member and an inner member. The second coupler may be mounted for rotation with the second input gear and include an outer member and an inner member. The input-gear selector may be mounted for rotation with the input shaft and positioned between the first and second couplers. The input-gear selector may include an outer hub, a first inner hub facing toward the first coupler, and a second inner hub facing toward the second coupler, the first and second inner hubs movable relative to the outer hub. The input-gear selector may be movable on the input shaft relative to the first and second couplers. Engagement of the input-gear selector with the first coupler drives rotation of the first input gear with rotation of the input shaft, and engagement of the input-gear selector with the second coupler drives rotation of the second input gear with rotation of the input shaft.

In illustrative embodiments, the input-gear selector may be positioned adjacent to the first coupler in a first configuration where torque applied to the input shaft in a first circumferential direction around the axis engages the first inner hub with the inner member of the first coupler to drive rotation of the first input gear with rotation of the input shaft. The outer hub and second inner hub may be positioned adjacent to the second coupler while the first inner hub remains engaged with the first coupler in a second configuration where torque applied to the input shaft in the first direction drives rotation of the input-gear selector relative to the second coupler. The outer hub of the input-gear selector may engage with the outer member of the second coupler in a third configuration where torque applied to the input shaft in the first direction drives rotation of the second input gear with rotation of the input shaft. The first inner hub may release from the first coupler and moves toward the outer hub in a fourth configuration where torque applied to the input shaft in the first direction drives rotation of the input-gear selector relative to the first coupler.

In illustrative embodiments, the second inner hub may engage with the inner member of the second coupler in a fifth configuration where torque applied from the input shaft on the input-gear selector in a second circumferential direction around the axis, opposite of the first direction, controls rotation of the second input gear. The outer hub and first inner hub may be positioned adjacent to the first coupler while the second inner hub remains engaged with the second coupler in a sixth configuration where torque applied from the input shaft on the input-gear selector in the second direction drives rotation of the input-gear selector relative to the first coupler. The outer hub of the input-gear selector may engage with the outer member of the first coupler in a seventh configuration where torque applied from the input shaft on the input-gear selector in the second direction controls rotation of the first input gear. The second inner hub may release from the second coupler and moves toward the outer hub in an eighth configuration where torque applied from the input shaft on the input-gear selector in the second direction drives rotation of the input-gear selector relative to the second coupler.

In illustrative embodiments, movement of the outer hub of the input-gear selector toward the first coupler may force movement of the first inner hub toward the first coupler. Movement of the outer hub toward the second coupler may force movement of the second inner hub toward the second coupler.

In illustrative embodiments, the transmission may further include an actuator configured to move the outer hub of the input-gear selector relative to the first and second couplers.

In illustrative embodiments, the transmission may further include a plurality of ramped teeth extending from the first coupler toward the input-gear selector, from the second coupler toward the input-gear selector, and from the input-gear selector toward each of the first and second couplers on opposing first and second sides of the input-gear selector. The teeth of the first side of the input-gear selector may be arranged to engage with the teeth of the first coupler, and the teeth of the second side of the input-gear selector may be arranged to engage with the teeth of the second coupler.

In illustrative embodiments, each tooth of the plurality of teeth may include an engaging face configured to engage with the engaging face of a corresponding tooth to block movement of the teeth past one another with relative rotation therebetween and a ramped surface configured to ride along the ramped surface of a corresponding tooth to allow the teeth to move past one another with relative rotation therebetween.

In illustrative embodiments, the engaging faces of the teeth on the outer member of the first coupler, the first inner hub, the second side of the outer hub, and the inner member of the second coupler may be arranged toward the first direction, and the engaging faces of the teeth on the inner member of the first coupler, the first side of the outer hub, the second inner hub, and the outer member of the second coupler may be arranged toward the second direction.

In illustrative embodiments, the inner member of the first coupler may be movable along the input shaft relative to the outer member of the first coupler, and the inner member of the second coupler may be movable along the input shaft relative to the outer member of the second coupler.

In illustrative embodiments, each of the first and second couplers may further include a first biasing element positioned between the inner and outer members thereof and a second biasing element positioned between the inner member thereof and the input-gear selector. The first biasing elements may be configured to bias the inner member away from the outer member of the respective first or second coupler, and the second biasing elements may be configured to bias the first and second inner hubs away from the respective first or second coupler.

In illustrative embodiments, the first input and output gear together may provide a lower drive ratio than the second input and output gear together.

According to an aspect of the present disclosure, a clutch arrangement may include a first coupler, a second coupler, and an input-gear selector. The first coupler may be mounted for rotation with a first input gear about an axis and include an outer member and an inner member. The second coupler may be mounted for rotation with a second input gear about the axis and include an outer member and an inner member. The input-gear selector may be mounted for rotation with an input shaft about the axis and positioned between the first and second couplers. The input-gear selector may include an outer hub, a first inner hub facing toward the first coupler, and a second inner hub facing toward the second coupler, the first and second inner hubs movable relative to the outer hub. The input-gear selector may be movable on the input shaft relative to the first and second couplers. Engagement of the input-gear selector with the first coupler drives rotation of the first input gear with rotation of the input shaft, and engagement of the input-gear selector with the second coupler drives rotation of the second input gear with rotation of the input shaft.

In illustrative embodiments, the input-gear selector may be positioned adjacent to the first coupler in a first configuration where torque applied to the input shaft in a first circumferential direction around the axis engages the first inner hub with the inner member of the first coupler to drive rotation of the first input gear with rotation of the input shaft. The outer hub and second inner hub may be positioned adjacent to the second coupler while the first inner hub remains engaged with the first coupler in a second configuration where torque applied to the input shaft in the first direction drives rotation of the input-gear selector relative to the second coupler. The outer hub of the input-gear selector may engage with the outer member of the second coupler in a third configuration where torque applied to the input shaft in the first direction drives rotation of the second input gear with rotation of the input shaft. The first inner hub may release from the first coupler and moves toward the outer hub in a fourth configuration where torque applied to the input shaft in the first direction drives rotation of the input-gear selector relative to the first coupler.

In illustrative embodiments, the second inner hub may engage with the inner member of the second coupler in a fifth configuration where torque applied from the input shaft on the input-gear selector in a second circumferential direction around the axis, opposite of the first direction, controls rotation of the second input gear. The outer hub and first inner hub may be positioned adjacent to the first coupler while the second inner hub remains engaged with the second coupler in a sixth configuration where torque applied from the input shaft on the input-gear selector in the second direction drives rotation of the input-gear selector relative to the first coupler. The outer hub of the input-gear selector may engage with the outer member of the first coupler in a seventh configuration where torque applied from the input shaft on the input-gear selector in the second direction controls rotation of the first input gear. The second inner hub may release from the second coupler and moves toward the outer hub in an eighth configuration where torque applied from the input shaft on the input-gear selector in the second direction drives rotation of the input-gear selector relative to the second coupler.

In illustrative embodiments, movement of the outer hub of the input-gear selector toward the first coupler may force movement of the first inner hub toward the first coupler, and movement of the outer hub toward the second coupler may force movement of the second inner hub toward the second coupler.

In illustrative embodiments, the clutch arrangement may further include a plurality of ramped teeth extending from the first coupler toward the input-gear selector, from the second coupler toward the input-gear selector, and from the input-gear selector toward each of the first and second couplers on opposing first and second sides of the input-gear selector. The teeth of the first side of the input-gear selector may be arranged to engage with the teeth of the first coupler, and the teeth of the second side of the input-gear selector may be arranged to engage with the teeth of the second coupler.

In illustrative embodiments, each tooth of the plurality of teeth may include an engaging face configured to engage with the engaging face of a corresponding tooth to block movement of the teeth past one another with relative rotation therebetween and a ramped surface configured to ride along the ramped surface of a corresponding tooth to allow the teeth to move past one another with relative rotation therebetween.

In illustrative embodiments, the engaging faces of the teeth on the outer member of the first coupler, the first inner hub, the second side of the outer hub, and the inner member of the second coupler may be arranged toward the first direction, and the engaging faces of the teeth on the inner member of the first coupler, the first side of the outer hub, the second inner hub, and the outer member of the second coupler may be arranged toward the second direction.

In illustrative embodiments, the inner member of the first coupler may be movable along the input shaft relative to the outer member of the first coupler, and the inner member of the second coupler may be movable along the input shaft relative to the outer member of the second coupler.

In illustrative embodiments, each of the first and second couplers may further include a first biasing element positioned between the inner and outer members thereof and a second biasing element positioned between the inner member thereof and the input-gear selector. The first biasing elements may be configured to bias the inner member away from the outer member of the respective first or second coupler, and the second biasing elements may be configured to bias the first and second inner hubs away from the respective first or second coupler.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
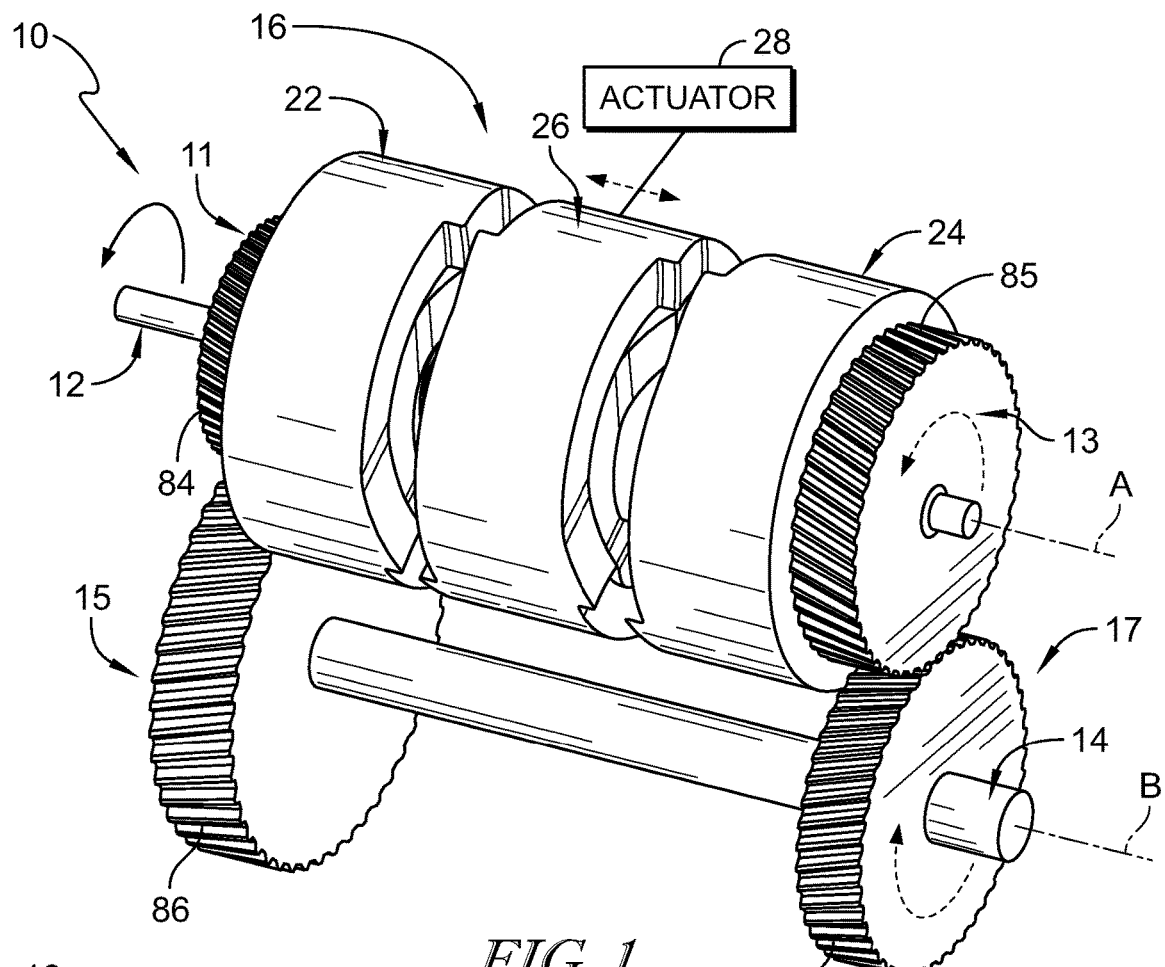
FIG. 1 is a perspective view of an embodiment of a transmission in accordance with the present disclosure showing that the transmission includes an input shaft, an output shaft, and a clutch arrangement and suggesting that an input-gear selector is movable to engage couplers associated with input gears for transferring rotation of the input shaft through the input gears to output gears on the output shaft.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

A transmission 10 in accordance with the present disclosure is shown in FIG. 1. The transmission 10 includes an input shaft 12 arranged for rotation about an axis A, an output shaft 14 arranged for rotation about an axis B, and a clutch arrangement 16. The input shaft 12 is coupled to a drive unit (not shown), and input gears 11, 13 coupled to the input shaft 12 are mated with corresponding output gears 15, 17 coupled to the output shaft 14 for connection with a load to be driven by the drive unit via the transmission 10. In the illustrative embodiment, the output gears 15, 17 are fixed relative to the output shaft 14 for rotation with the output shaft 14. The input gears 11, 13 are free to rotate on the input shaft 12, and the clutch arrangement 16 selectively drives one of the input gears 11, 13 with rotation of the input shaft 12 to drive the corresponding output gear 15, 17 for rotation of the output shaft 14. The input gears 11, 13 provide different gear ratios with the corresponding output gears 15, 17 to allow the output shaft 14 to rotate at different speeds for the same rotational speed of the input shaft 12. In the illustrative embodiment, the first input gear 11, in combination with the first output gear 15, provides a lower drive ratio than the second input gear 13, in combination with the second output gear 17.

In some embodiments, the transmission 10 is part of a vehicle, the drive unit is a motor of the vehicle, and the load is the drive wheels, caterpillar tracks, propels, etc. that impart the vehicle with locomotion when driven by the drive unit via the transmission 10. The drive unit can be embodied as any type of motor, such as an electric motor or internal combustion engine having a reciprocating or a rotary configuration, that provides rotational power to the transmission 10 and therethrough to the load. The transmission 10 may be embodied as a conventional automotive transmission, such as a manual transmission, an automatic transmission, or a semi-automatic transmission, and may include the clutch arrangement 16 in combination with other components commonly found in automotive transmissions. Alternatively, in some embodiments, the transmission 10 may be embodied as a continuously variable transmission (CVT) or an infinitely variable transmission (IVT), and may include the clutch arrangement 16 in combination with other components commonly found in those types of transmissions.

The clutch arrangement 16 includes a first coupler 22, a second coupler 24, and an input-gear selector 26 between the first and second couplers 22, 24 as shown in FIG. 1. The first coupler 22 is configured to rotate with the first input gear 11 and the second coupler 24 is configured to rotate with the second input gear 13. The input-gear selector 26 rotates with the input shaft 12 and an actuator 28 selectively moves the input-gear selector 26 along the input shaft 12 for engagement with the first and second couplers 22, 24.

Figure 2:
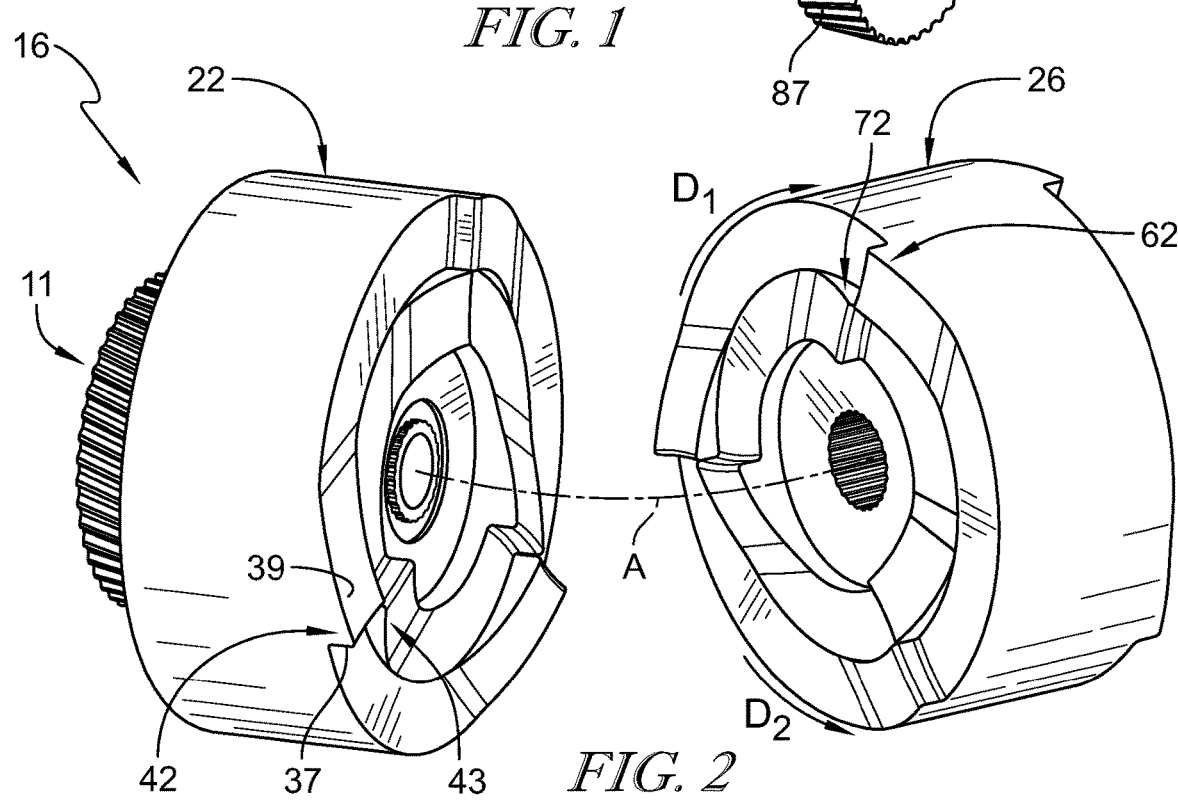
FIG. 2 is a partial exploded assembly view of the clutch arrangement of FIG. 1 showing that oppositely oriented teeth are arranged to engage with one another for transmitting torque between the input-gear selector and the couplers.

In the illustrative embodiment, corresponding sets of teeth on the mating components in the clutch arrangement 16 engage with one another to transfer rotational power from the input-gear selector 26 to the input gears 11, 13 by way of the couplers 22, 24 as suggested in FIG. 2. For example, as shown in FIG. 2, the first coupler 22 has an outer set of teeth 42 and an inner set of teeth 43 arranged in opposite circumferential directions. The input-gear selector 26 also has an outer set of teeth 62 and an inner set of teeth 72 arranged in opposite circumferential directions. The inner sets of teeth 43, 72 engage with one another to apply torque in a first circumferential direction $D_1$ (around the axis A) and the outer sets of teeth 42, 62 engage with one another to apply torque in a second circumferential direction $D_2$ opposite of the first direction $D_1$. Each tooth (including teeth 42, 43, 62, 72) has an engaging face 37 for engaging with the face of another tooth to transmit torque between the mating components and a ramped surface 39 such that the teeth apply torque in a single direction and ride over one another in the opposite direction.

In the illustrative embodiment, torque can be applied from the input shaft 12 to the input-gear selector 26 in the first or second direction $D_1$, $D_2$ depending on the operational state of the drive unit and/or load as suggested in FIGS. 1 and 2. For example, during acceleration of a vehicle, the drive unit drives rotation of the input shaft 12 such that torque is applied to the input-gear selector 26 in the first direction $D_1$ to drive rotation of the selected first or second input gear 11, 13 and transfer torque through the corresponding first or second output gear 15, 17 to the output shaft 14 for driving the load. During deceleration of a vehicle, the load (e.g., the wheels of the vehicle) carries momentum and the input shaft 12 applies torque to the input-gear selector 26 in the second direction $D_2$ to control (e.g., slow) rotation of the load. For example, in a vehicle with an electric motor, the electric motor can act as a generator converting momentum of the vehicle into electrical energy for use in the vehicle while slowing rotation the wheels. As further detailed herein, different sets of the teeth on the input-gear selector 26 and couplers 22, 24 carry the applied torque depending on the direction of the applied torque and position of the input-gear selector 26.

Figure 3:
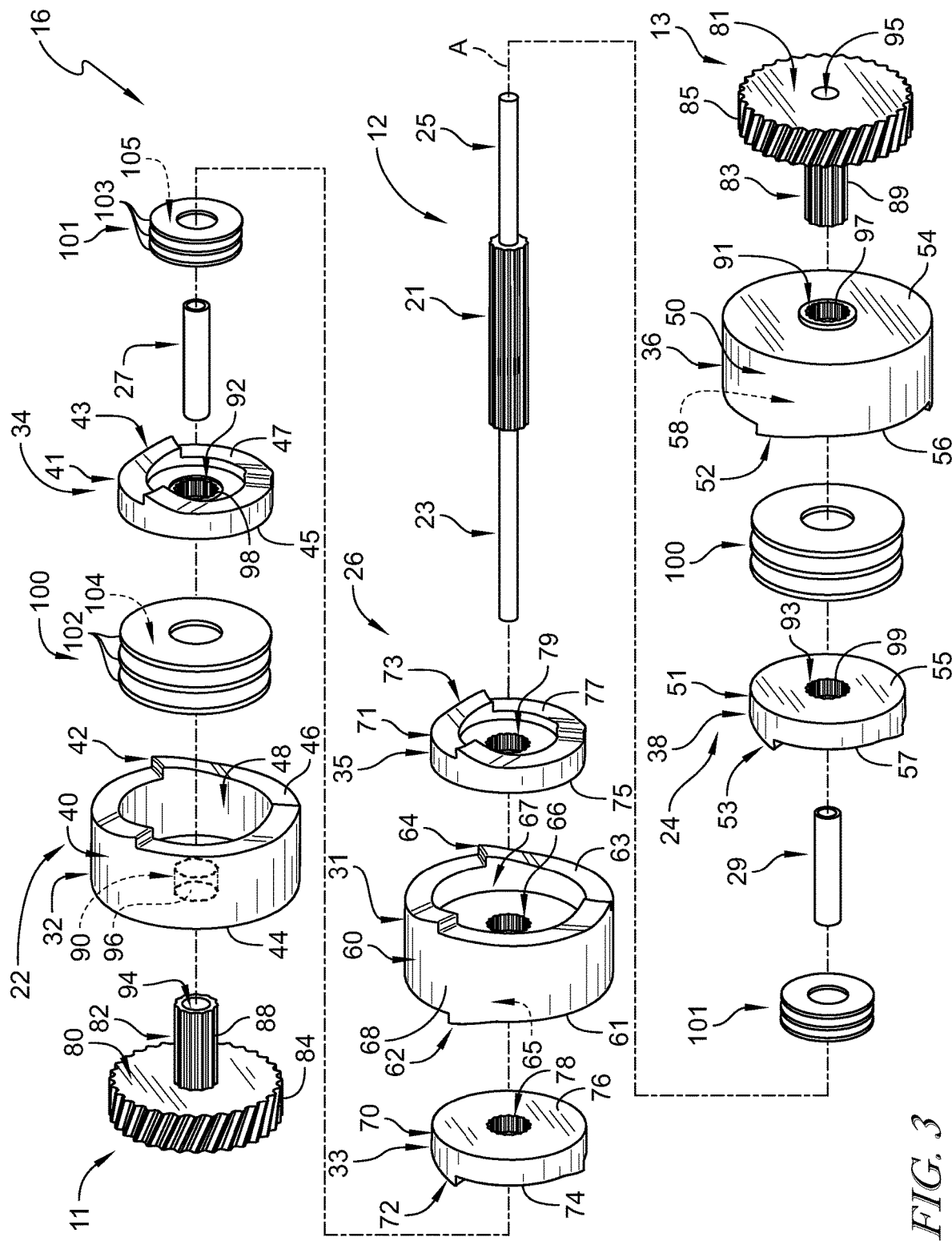
FIG. 3 is a perspective exploded assembly view of the clutch arrangement of FIG. 1 showing that each coupler includes an outer member and an inner member and that the input-gear selector includes an outer hub and inner hubs each associated with a respective one of couplers.
Figure 4:
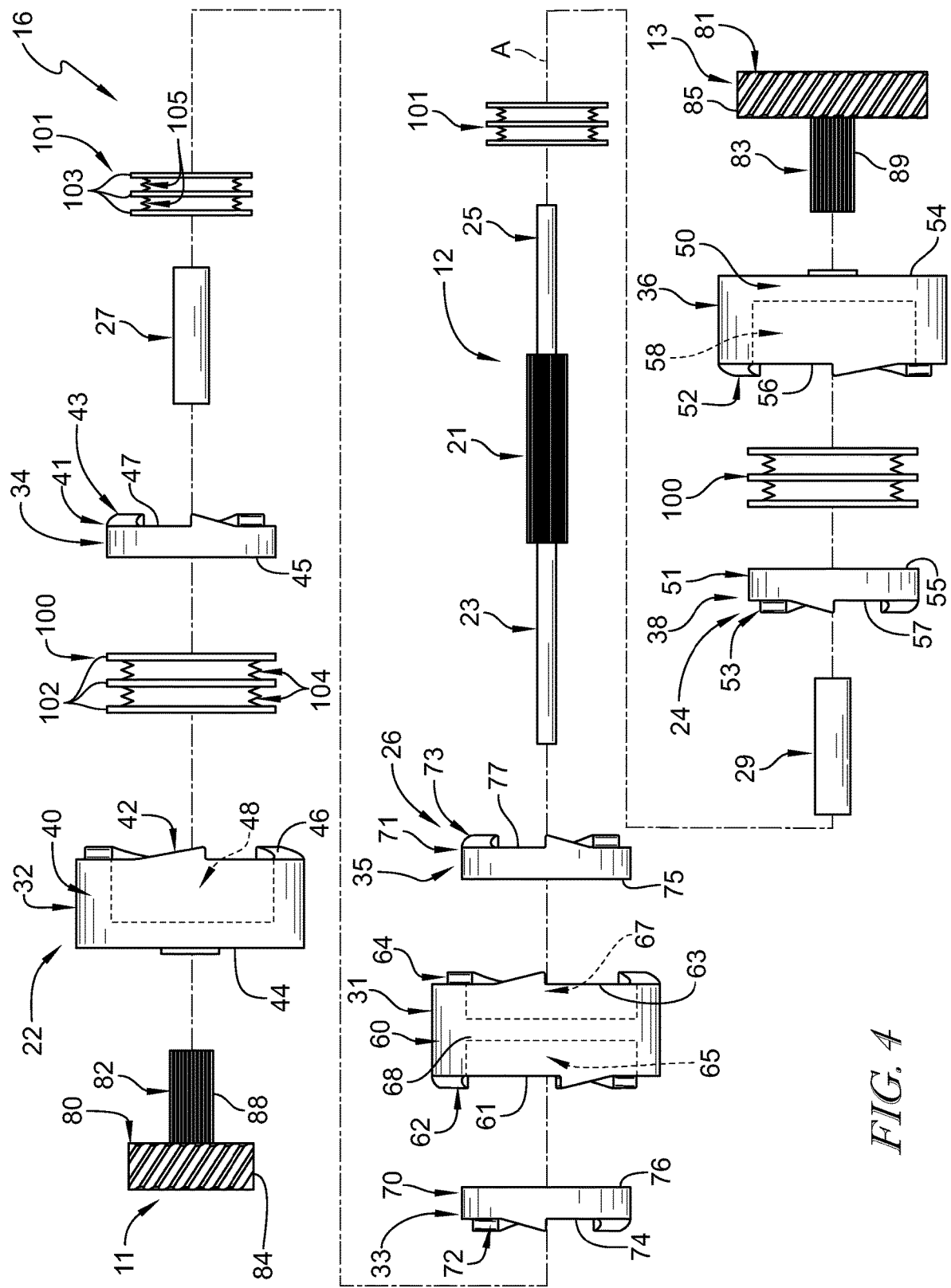
FIG. 4 is an exploded assembly view of the clutch arrangement of FIG. 1.
Figure 5:
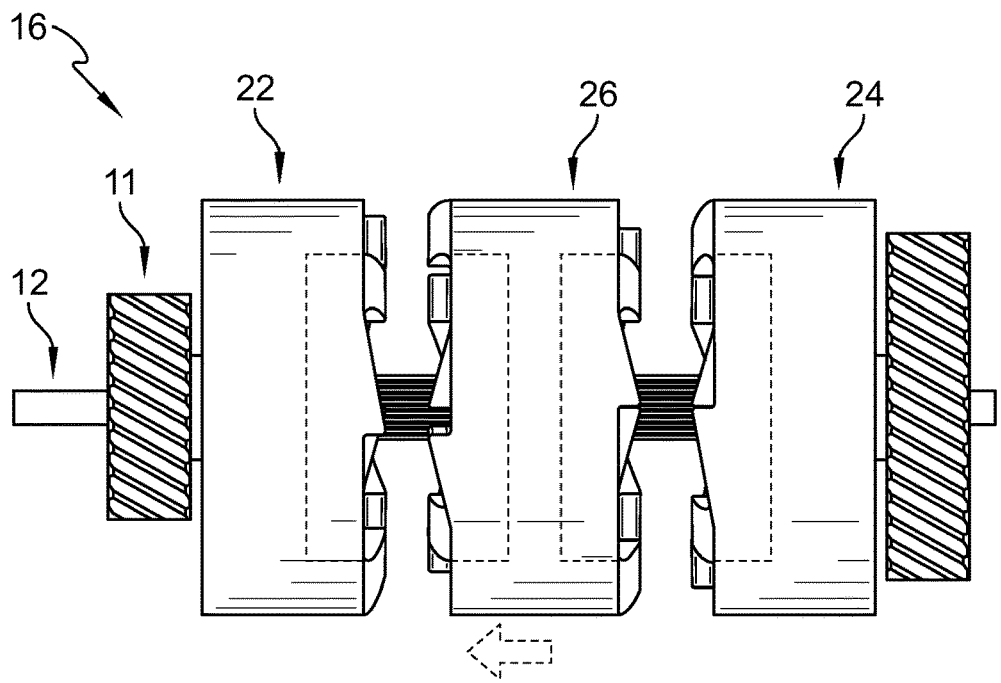
FIGS. 5-14 are a series of views illustrating operation of the clutch arrangement.
Figure 6:
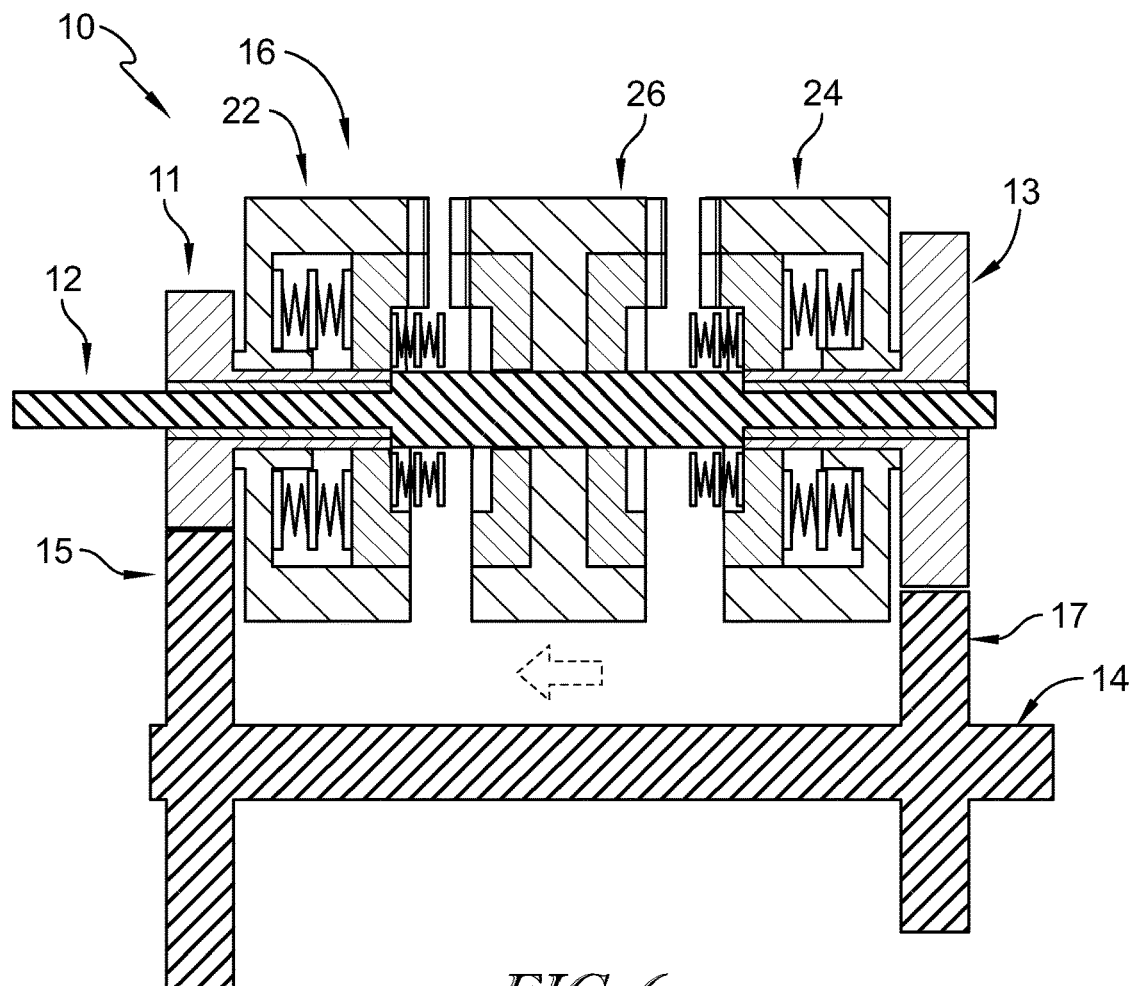
Figure 7:
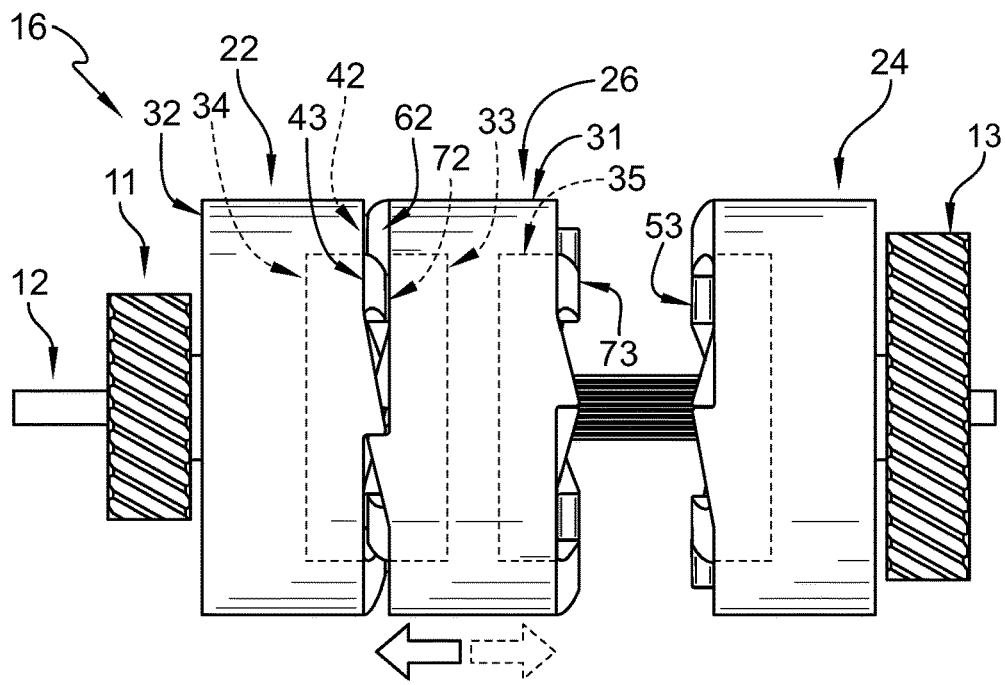
Figure 8:
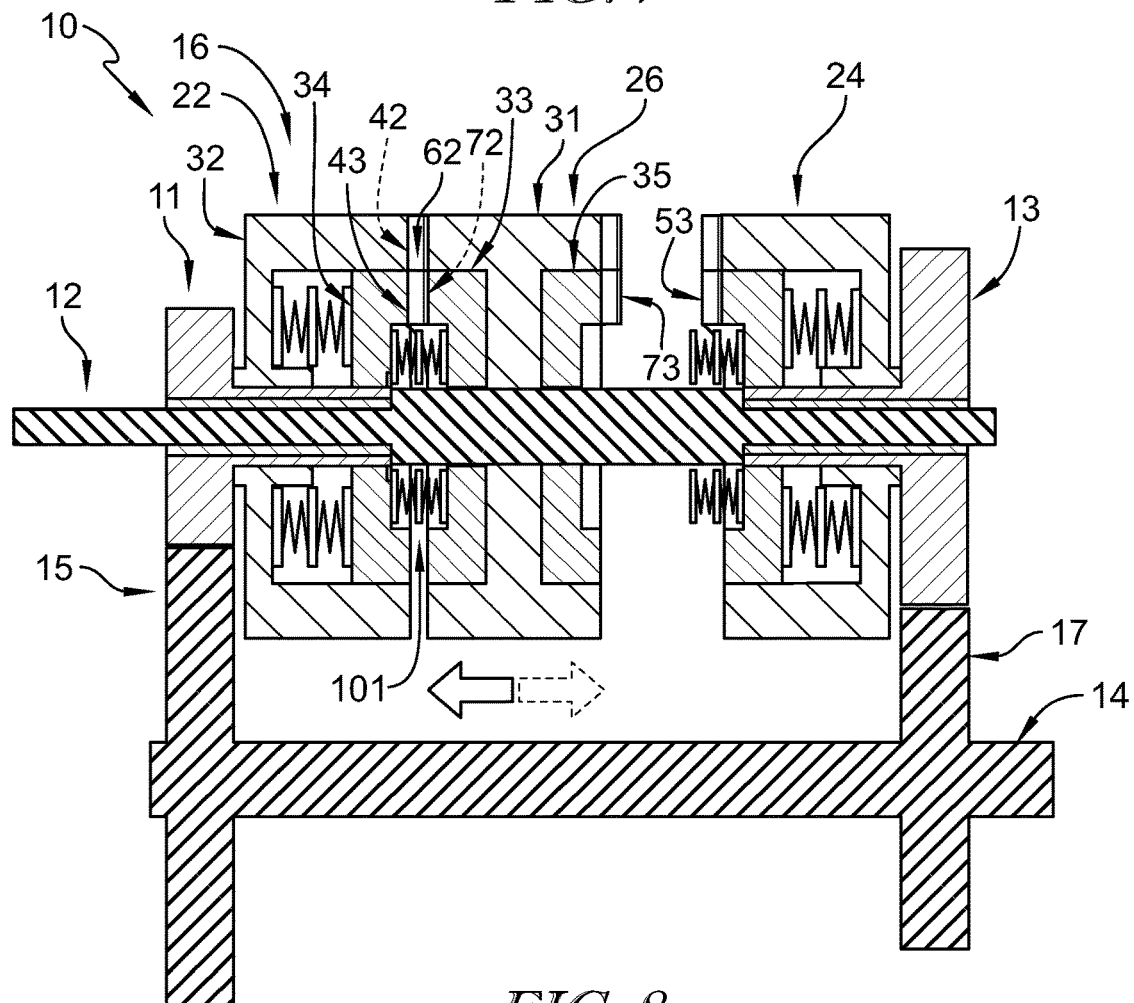
Figure 9:
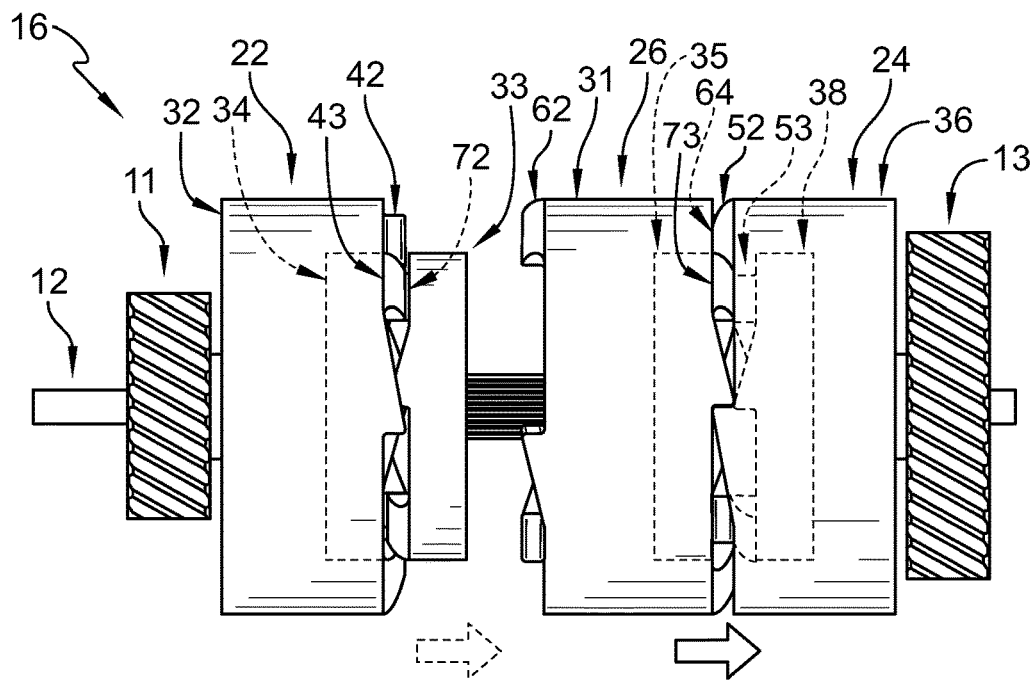
Figure 10:
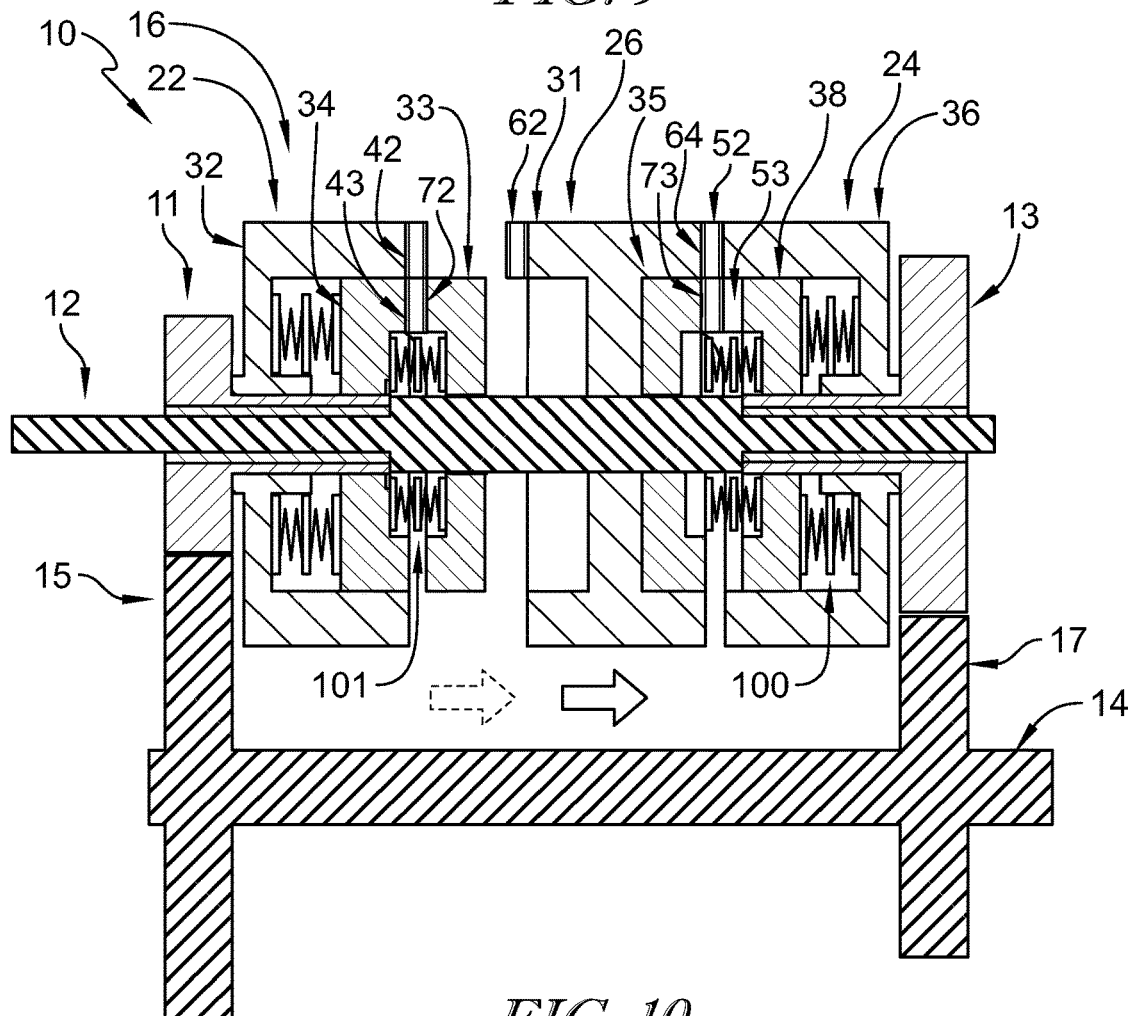
Figure 11:
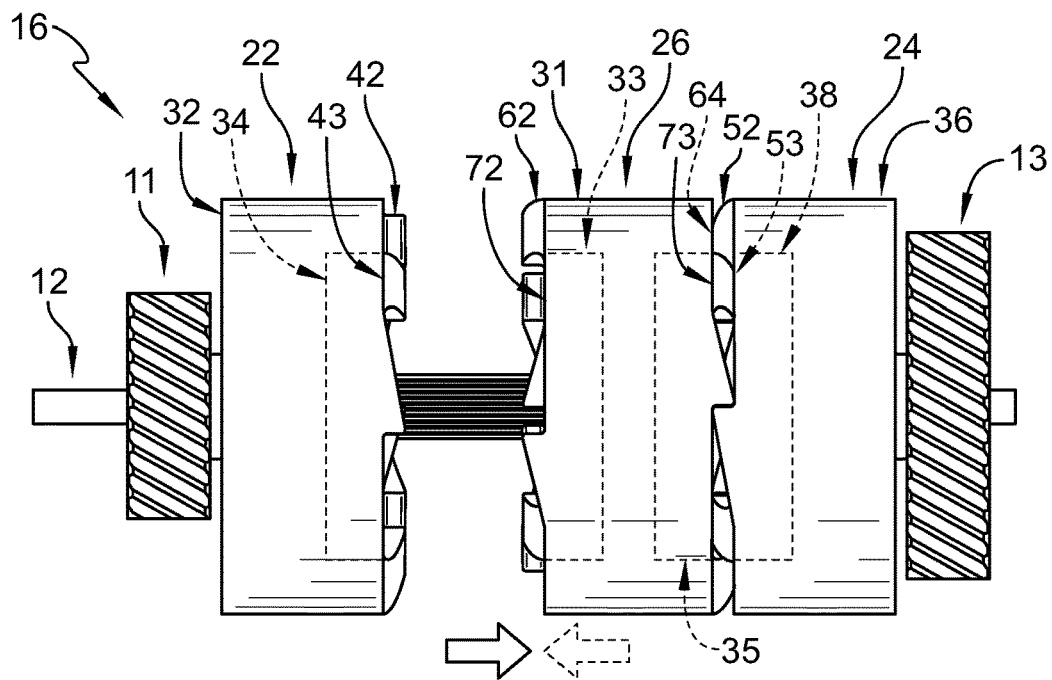
Figure 12:
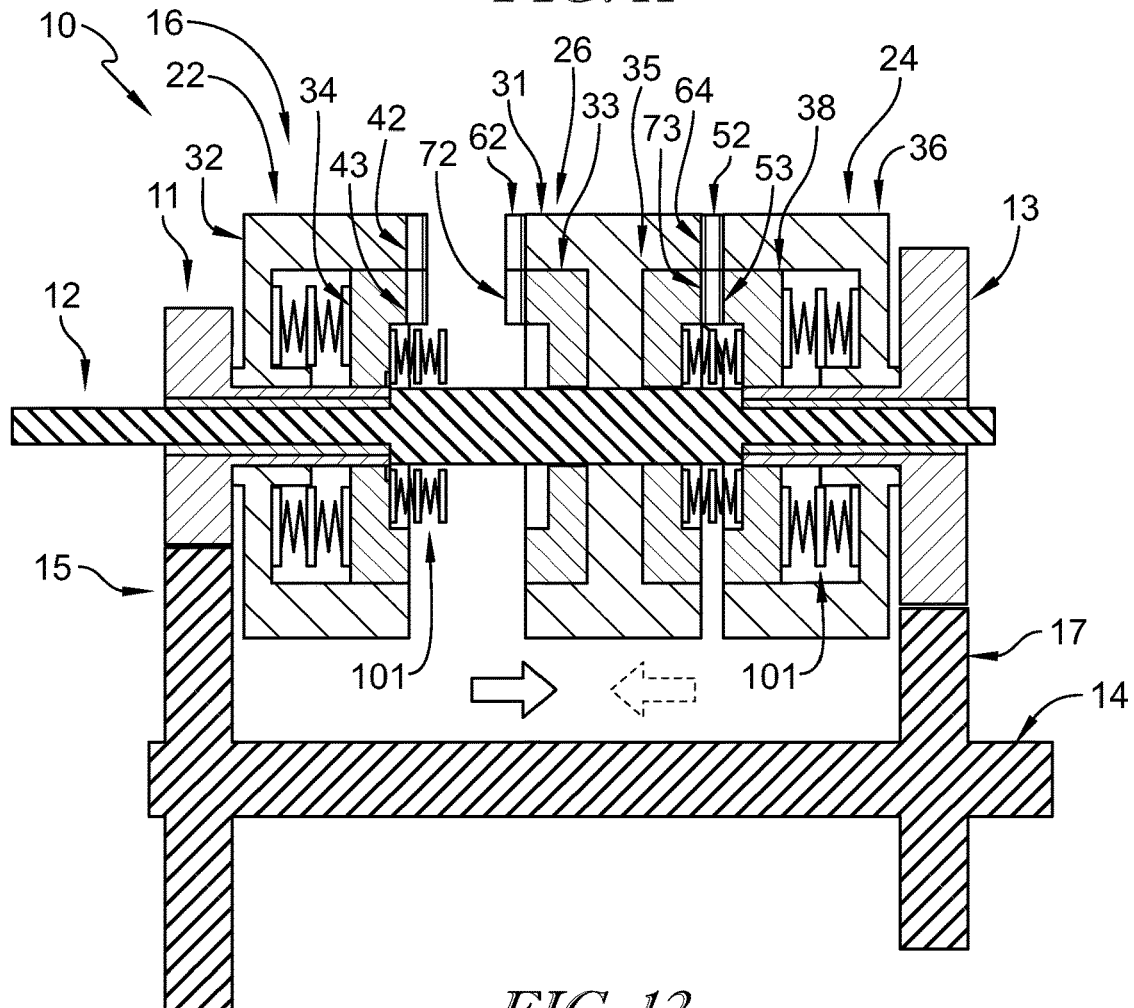
Figure 13:
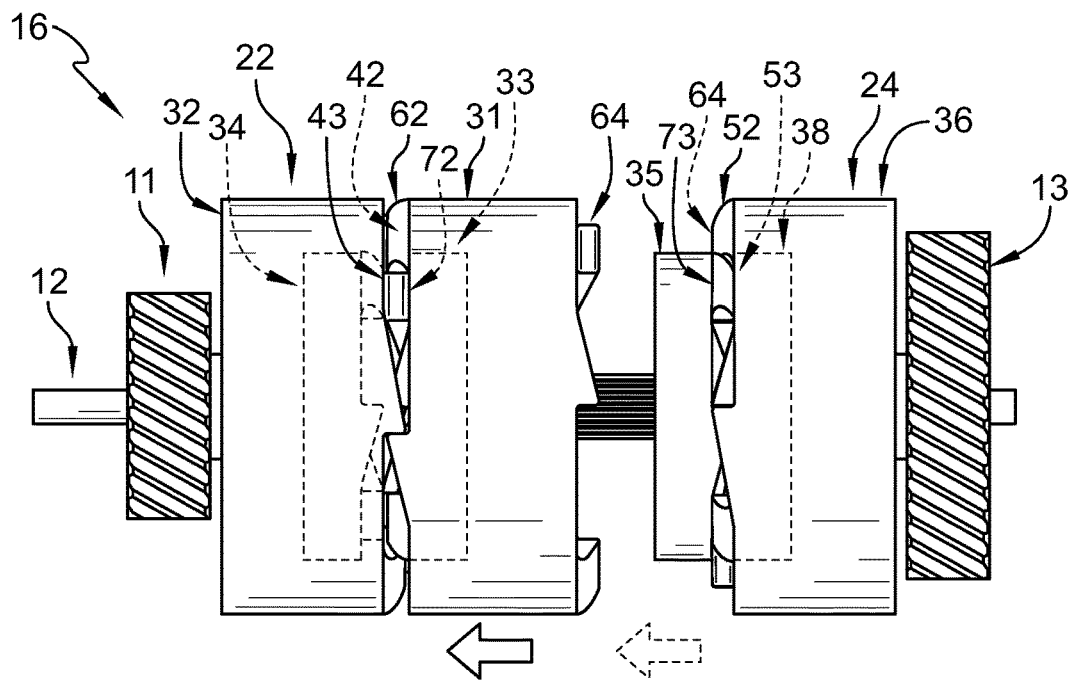
Figure 14:
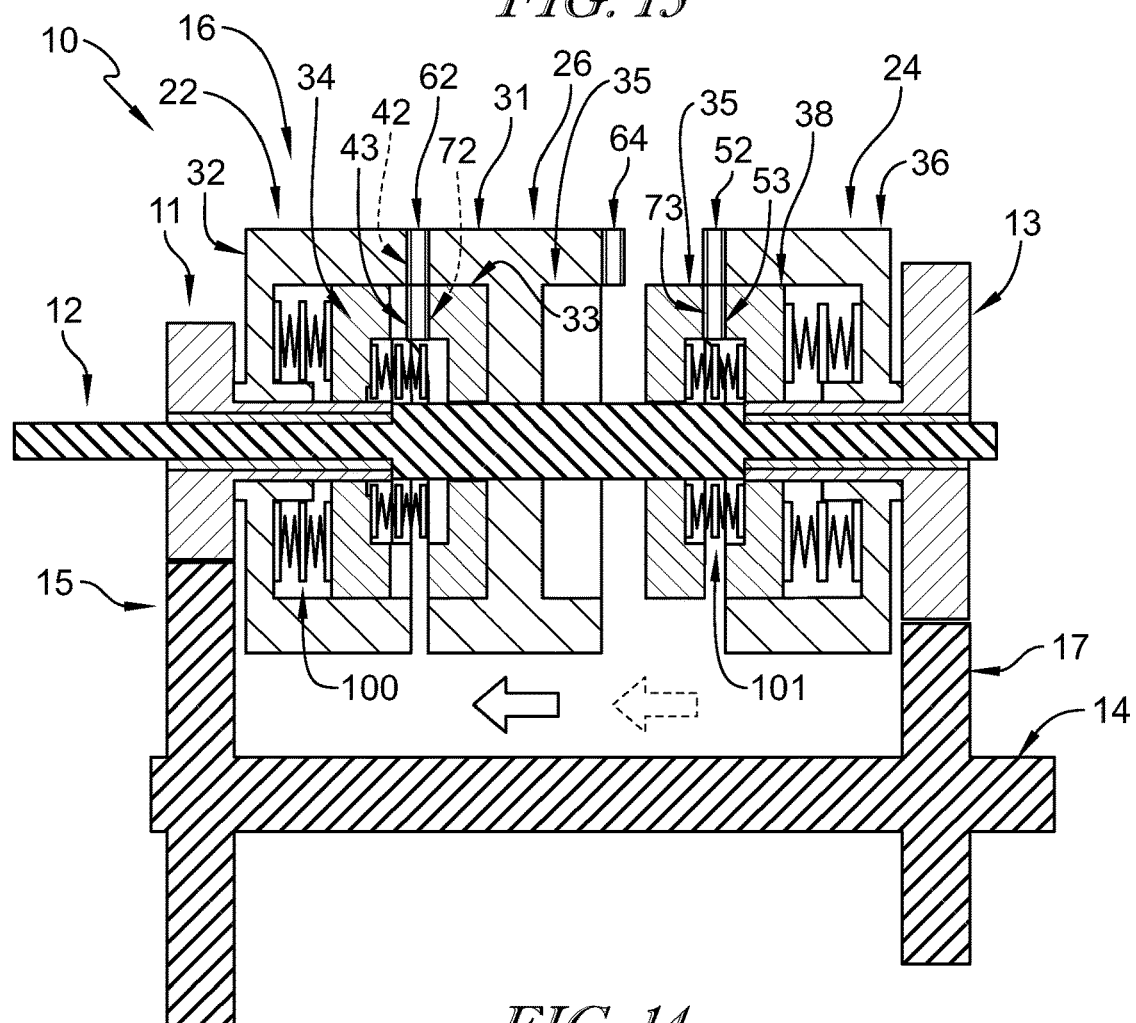

As shown in FIGS. 3 and 4, each of the first and second couplers 22, 24 includes an outer member 32, 36 and an inner member 34, 38, respectively. The input-gear selector 26 includes an outer hub 31, a first inner hub 33, and a second inner hub 35. The outer members 32, 36 of the first and second couplers 22, 24 are arranged to engage with the outer hub 31 of the input-gear selector 26 with movement of the input-gear selector 26 as suggested in FIGS. 5-14. The inner members 34, 38 of the first and second couplers 22, 24 are arranged to engage with the first and second inner hubs 33, 35, respectively, of the input-gear selector 26 with movement of the input-gear selector 26.

The outer member 32 of the first coupler 22 includes a body 40 and a plurality of teeth 42 extending from the body 40 toward the input-gear selector 26 as shown in FIGS. 3 and 4. The body 40 defines a gear side 44 and an opposite selector side 46. The gear side 44 of the body 40 faces toward the first input gear 11 and the teeth 42 are circumferentially spaced along the selector side 46 of the body 40 for engagement with the outer hub 31 of the input-gear selector 26. A cavity 48 is formed into the selector side 46 of the body 40 and sized to receive the inner member 34 therein.

The inner member 34 of the first coupler 22 includes a body 41 and a plurality of teeth 43 extending from the body 41 toward the input-gear selector 26 as shown in FIGS. 3 and 4. The body 41 defines a gear side 45 and an opposite selector side 47. The gear side 45 of the body 41 faces toward the first input gear 11 and the teeth 43 are circumferentially spaced along the selector side 47 of the body 41 for engagement with the first inner hub 33 of the input-gear selector 26. The teeth 43 of the inner member 34 and are arranged in an opposite circumferential direction (around the axis A) from the teeth 42 of the outer member 32.

The outer member 36 of the second coupler 24 includes a body 50 and a plurality of teeth 52 extending from the body 50 toward the input-gear selector 26 as shown in FIGS. 3 and 4. The body 50 defines a gear side 54 and an opposite selector side 56. The gear side 54 of the body 50 faces toward the second input gear 13 and the teeth 52 are circumferentially spaced along the selector side 56 of the body 50 for engagement with the outer hub 31 of the input-gear selector 26. A cavity 58 is formed into the selector side 56 of the body 50 and sized to receive the inner member 38 therein.

The inner member 38 of the second coupler 24 includes a body 51 and a plurality of teeth 53 extending from the body 51 toward the input-gear selector 26 as shown in FIGS. 3 and 4. The body 51 defines a gear side 55 and an opposite selector side 57. The gear side 55 of the body 51 faces toward the second input gear 13 and the teeth 53 are circumferentially spaced along the selector side 57 of the body 51 for engagement with the second inner hub 35 of the input-gear selector 26. The teeth 53 of the inner member 38 and are arranged in an opposite circumferential direction (around the axis A) from the teeth 52 of the outer member 36.

The outer hub 31 of the input-gear selector 26 includes a body 60, a first plurality of teeth 62 extending from the body 60 toward the first coupler 22, and a second plurality of teeth 64 extending from the body 60 toward the second coupler 24 as shown in FIGS. 3 and 4. The body 60 defines a first side 61 and an opposite second side 63. The first plurality of teeth 62 are circumferentially spaced along the first side 61 of the body 60 for engagement with the teeth 42 of the outer member 32 of the first coupler 22. The second plurality of teeth 64 are circumferentially spaced along the second side 63 of the body 60 for engagement with the teeth 52 of the outer member 36 of the second coupler 24. The first plurality of teeth 62 are arranged in an opposite circumferential direction (around the axis A) from the second plurality of teeth 64 of the outer hub 31. A first cavity 65 is formed into the first side 61 of the body 60 and sized to receive the first inner hub 33 therein. A second cavity 67 is formed into the second side 63 of the body 60 and sized to receive the second inner hub 35 therein. In some embodiments, an exterior 68 of the body 60 is formed to define an engagement feature, such as an inward groove or outward flange, for connecting the actuator 28 with the input-gear selector 26, such as with a shift fork having an outward flange or inward groove, to allow movement the input-gear selector 26 relative to the first and second couplers 22, 24. One example of such an engagement feature is shown in U.S. Pat. No. 9,328,775, the disclosure of which is expressly incorporated by reference herein in its entirety.

The first inner hub 33 of the input-gear selector 26 includes a body 70 and a plurality of teeth 72 extending from the body 70 toward the first coupler 22 as shown in FIGS. 3 and 4. The body 70 defines a first side 74 and an opposite second side 76. The first side 74 of the body 70 faces toward the first coupler 22 and the teeth 72 are circumferentially spaced along the first side 74 of the body 70 for engagement with the teeth 43 of the inner member 34 of the first coupler 22. The teeth 72 of the first inner hub 33 and are arranged in an opposite circumferential direction (around the axis A) from the first plurality of teeth 62 of the outer hub 31.

The second inner hub 35 of the input-gear selector 26 includes a body 71 and a plurality of teeth 73 extending from the body 71 toward the second coupler 24 as shown in FIGS. 3 and 4. The body 71 defines a first side 75 and an opposite second side 77. The second side 77 of the body 71 faces toward the second coupler 24 and the teeth 73 are circumferentially spaced along the second side 77 of the body 71 for engagement with the teeth 53 of the inner member 38 of the second coupler 24. The teeth 73 of the second inner hub 35 and are arranged in an opposite circumferential direction (around the axis A) from the second plurality of teeth 64 of the outer hub 31.

Each set of teeth 42, 43, 52, 53, 62, 64, 72, 73 is illustratively shown to include three teeth evenly spaced circumferentially around their associated component. In some embodiments, more than three teeth are used. In some embodiments, less than three teeth are used. In some embodiments, the teeth 43, 53, 72, 73 of the inner components 33, 34, 35, 38 are circumferentially offset from the teeth 42, 52, 62, 64 of the outer components 31, 32, 36. In some embodiments, the amount of offset of the teeth 62, 72 can be different than the amount of offset between the teeth 42, 43, and the amount of offset of the teeth 64, 73 can be different than the amount of offset between the teeth 52, 53. In some embodiments, the amount of offset can be adjusted to adjust an amount of backlash as the direction of torque changes between the first direction $D_1$ and the second direction $D_2$. In some embodiments, the amount of offset is about 1 degree to about 2 degrees. In some embodiments, a wider or narrower offset are used. In the illustrative embodiment, the mating teeth in each set are positioned with substantially similar circumferential spacing such that all teeth in the mating sets engage to collectively carry the applied torque load.

In the illustrative embodiment, the first input gear 11 includes a body 80 and a stub shaft 82 extending from the body 80 toward the first coupler 22 as shown in FIGS. 3 and 4. Gear teeth 84 are formed along a radially outer perimeter of the body 80 of the first input gear 11 for engagement with gear teeth 86 on the first output gear 15. The stub shaft 82 extends through bores 90, 92 of the outer member 32 and inner member 34, respectively, for mounting the first coupler 22 on the first input gear 11. The stub shaft 82 engages with the first coupler 22 such that the first input gear 11 rotates with the first coupler 22. For example, an anti-rotation feature can be included to block rotation of the first coupler 22 relative to the first input gear 11, such as radially outward extending splines 88 on the stub shaft 82 that mate with radially inward extending splines 96, 98 of the bores 90, 92, respectively, to block rotation of the outer member 32 and inner member 34 relative to first input gear 11. The first input gear 11 and first coupler 22 are mounted on the input shaft 12 with a bearing 27, received in a bore 94 of the first input gear 11, to allow rotation of the first input gear 11 and first coupler 22 relative to the input shaft 12. In some embodiments, fasteners, such as C-clips, snap rings, etc., are used to hold the first coupler 22 on the first input gear 11, and the first input gear 11 and the bearing 27 on the input shaft 12.

Similarly, the second input gear 13 includes a body 81 and a stub shaft 83 extending from the body 81 toward the second coupler 24 as shown in FIGS. 3 and 4. Gear teeth 85 are formed along a radially outer perimeter of the body 81 of the second input gear 13 for engagement with gear teeth 87 on the second output gear 17. The stub shaft 83 extends through bores 91, 93 of the outer member 36 and inner member 38, respectively, for mounting the second coupler 24 on the second input gear 13. The stub shaft 83 engages with the second coupler 24 such that the second input gear 13 rotates with the second coupler 24. For example, an anti-rotation feature can be included to block rotation of the second coupler 24 relative to the second input gear 13, such as radially outward extending splines 89 on the stub shaft 83 that mate with radially inward extending splines 97, 99 of the bores 91, 93, respectively, to block rotation of the outer member 36 and inner member 38 relative to second input gear 13. The second input gear 13 and second coupler 24 are mounted on the input shaft 12 with a bearing 29, received in a bore 95 of the second input gear 13, to allow rotation of the second input gear 13 and second coupler 24 relative to the input shaft 12. In some embodiments, fasteners, such as C-clips, snap rings, etc., are used to hold the second coupler 24 on the second input gear 13, and the second input gear 13 and the bearing 29 on the input shaft 12.

Biasing elements 100 are positioned between the outer member 32, 36 and the inner member 34, 38 of each of the first and second couplers 22, 24 as shown in FIGS. 3 and 4. The biasing elements 100 are configured to bias the inner members 34, 38 toward the input-gear selector 26. In the illustrative embodiment, each of the biasing elements 100 is in the form of a spring pack having a plurality of plates 102 with springs 104 positioned between the plates 102. In some embodiments, the biasing elements 100 assume other forms, such as wave springs, coils springs, and other single or multi-component arrangements.

Biasing elements 101 are positioned between the inner members 34, 38 of each of the first and second couplers 22, 24 and the first and second inner hubs 33, 35 of the input-gear selector 26 as shown in FIGS. 3 and 4. The biasing elements 101 are configured to bias the first and second inner hubs 33, 35 away from the inner members 34, 38. In the illustrative embodiment, each of the biasing elements 101 is in the form of a spring pack having a plurality of plates 103 with springs 105 positioned between the plates 103. In some embodiments, the biasing elements 101 assume other forms, such as wave springs, coils springs, and other single or multi-component arrangements.

The input shaft 12 includes a center section 21 and two end sections 23, 25 extending from opposite ends of the center section 21 as shown in FIGS. 3 and 4. The input-gear selector 26 is mounted on the center section 21 for rotation with the input shaft 12. The input shaft 12 engages with the input-gear selector 26 such that the input-gear selector 26 rotates with the input shaft 12. For example, an anti-rotation feature can be included to block rotation of the input-gear selector 26 relative to the input shaft 12, such as radially outward extending splines (similar to splines 89 of stub shaft 83) on the center section 21 that mate with radially inward extending splines of bores 66, 78, 79 formed through the hubs 31, 33, 35, respectively, of the input-gear selector 26 (similar to splines 97 of bore 91) to block rotation of the input-gear selector 26 relative to the input shaft 12.

Movement of the input-gear selector 26 relative to the first and second couplers 22, 24 allows for selection of the first or second input gear 11, 13 to be driven by torque applied to the input shaft 12 by the drive unit as suggested in FIGS. 5-14. The input-gear selector 26 is shown in a neutral position in FIGS. 5 and 6 where the input-gear selector 26 is spaced apart from the first and second couplers 22, 24 to allow free rotation of the input shaft 12 relative to the first and second input gears 11, 13 such that torque from the drive unit is not transferred to the output shaft 14.

The first input gear 11 is selected by moving the input-gear selector 26 into engagement with the first coupler 22 in a first configuration of the clutch arrangement 16 as suggested in FIGS. 5-8. With torque applied in the first direction $D_1$, the teeth 72 of the first inner hub 33 of the input-gear selector 26 engage with the teeth 43 of the inner member 34 of the first coupler to drive rotation of the first input gear 11 as suggested in FIGS. 7 and 8. The teeth 42 of the outer member 32 and the teeth 62 of the outer hub 31 are aligned with one another but do not contribute to driving rotation of the first input gear 11 (e.g., no transfer of torque between the teeth 42, 62) allowing for movement of the outer hub 31 away from the first coupler 24. In some embodiments, the teeth 42 are spaced away from the teeth 62 by an amount of backlash provided between the teeth of the second coupler 24 and the input-gear selector 26.

In an accelerating upshift, the clutch arrangement 16 moves from the first configuration to a second configuration where the first inner hub 33 of the input-gear selector 26 remains engaged with the inner member 34 of the first coupler 22 while the outer hub 31 moves toward the second coupler 24 as suggested in FIGS. 7-10. In this second configuration, torque applied by the input shaft 12 on the input-gear selector 26 in the first direction $D_1$ assists in maintaining engagement between the teeth 43 of the inner member 34 and the teeth 72 of the first inner hub 33 against the bias of the biasing element 101. Differential rotational speed between the first and second input gears 11, 13 (due to the different drive ratios) allows the teeth 64 of the outer hub 31 of the input-gear selector 26 to rotate toward engagement with the teeth 52 of the outer member 36 of the second coupler 24. The ramped surfaces 39 (see FIG. 2) of the teeth 73 of the second inner hub 35 ride along the ramped surfaces 39 of the teeth 53 of the inner member 38 and drive the inner member 38 into the outer member 36 (against the bias of the biasing element 100) during the relative rotation of the input-gear selector 26 to the second coupler 24. Once the teeth 73 of the second inner hub 35 pass over the teeth 53 of the inner member 38, the biasing element 100 forces the inner member 38 toward the second inner hub 35 as suggested in FIGS. 9-12. The teeth 53, 73 are aligned with one another but do not contribute to driving rotation of the second input gear 13. The faces 37 (see FIG. 2) of the teeth 64 of the outer hub 31 engage with the faces 37 of the teeth 52 of the outer member 36 to drive rotation of the second input gear 13, and synchronize the rotational speed of the second input gear 13 with the input shaft 12, in a third configuration of the clutch arrangement 16. The differential rotational speed between the first and second input gears 11, 13 rotates the teeth 43 of the inner member 34 away from the teeth 72 of the first inner hub 33 to release the first inner hub 33 from the inner member 34 and move the clutch arrangement 16 from the third configuration to a fourth configuration as suggested in FIGS. 11 and 12. The biasing element 101 forces the first inner hub 33 away from the inner member 34 and back toward the outer hub 31.

During deceleration of a vehicle, for example, the direction of applied torque from the input shaft 12 on the input-gear selector 26 changes from the first direction $D_1$ to the second direction $D_2$ as suggested in FIGS. 1 and 2. With the input-gear selector 26 still engaged with the second coupler, the faces 37 of the teeth 53 of the inner member 38 engage with the faces 37 of the teeth 73 of the second inner hub 35 to slow rotation of the output shaft 14 through the second input gear 13 and second output gear 17. In this fifth configuration of the clutch arrangement 16, the teeth 64 of the outer hub 31 are aligned with the teeth 52 of the outer member 36 but do not contribute to slowing rotation of the output shaft 14 through the second input gear 13 and second output gear 17 (e.g., no transfer of torque between the teeth 52, 64) allowing for movement of the outer hub 31 away from the second coupler 24. In some embodiments, the outer hub 31 rotates relative to the outer member 36, and spaces the teeth 52 away from the teeth 64, by an amount of backlash provided between the teeth of the second coupler 24 and the input-gear selector 26 in response to the direction of applied torque changing.

In a decelerating downshift, the clutch arrangement 16 moves from the fifth configuration to a sixth configuration where the second inner hub 35 of the input-gear selector 26 remains engaged with the inner member 38 of the second coupler 24 while the outer hub 31 moves toward the first coupler 22 as suggested in FIGS. 11-14. In this sixth configuration, torque applied by the input shaft 12 on the input-gear selector 26 in the second direction $D_2$ assists in maintaining engagement between the teeth 53 of the inner member 38 and the teeth 73 of the second inner hub 35. Differential rotational speed between the first and second input gears 11, 13 (due to the different drive ratios) allows the teeth 62 of the outer hub 31 of the input-gear selector 26 to rotate toward engagement with the teeth 42 of the outer member 32 of the first coupler 22. The ramped surfaces 39 (see FIG. 2) of the teeth 72 of the first inner hub 33 ride along the ramped surfaces 39 of the teeth 43 of the inner member 34 and drive the inner member 34 into the outer member 32 during the relative rotation of the input-gear selector 26 to the first coupler 22 as suggested in FIGS. 13 and 14. Once the teeth 72 of the first inner hub 33 pass over the teeth 43 of the inner member 34, the biasing element 100 forces the inner member 34 toward the first inner hub 33 (compare FIGS. 13 and 14 with FIGS. 7 and 8). The teeth 43, 72 are aligned with one another but do not contribute to slowing rotation of the output shaft 14 through the second input gear 13 and second output gear 17. The faces 37 (see FIG. 2) of the teeth 62 of the outer hub 31 engage with the faces 37 of the teeth 42 of the outer member 32 to transfer torque to the first input gear 11, and synchronize the rotational speed of the first input gear 11 with the input shaft 12, in a seventh configuration of the clutch arrangement 16. The differential rotational speed between the first and second input gears 11, 13 rotates the teeth 73 of the second inner hub 35 away from the teeth 53 of the inner member 38 to release the second inner hub 35 from the inner member 38 and move the clutch arrangement 16 from the seventh configuration to an eighth configuration as suggested in FIGS. 7 and 8. The biasing element 101 forces the second inner hub 35 away from the inner member 38 and back toward the outer hub 31. The teeth 42, 62 continue to carry torque during continued deceleration (i.e., torque applied in the second direction $D_2$). Acceleration of the vehicle changes the direction of applied torque from the input shaft 12 on the input-gear selector 26 from the second direction $D_2$ to the first direction $D_1$, and the teeth 43 of the inner member 34 engage with the teeth 72 of the first inner hub 33 to carry the applied torque and drive rotation of the first input gear 11.

Figure 15:
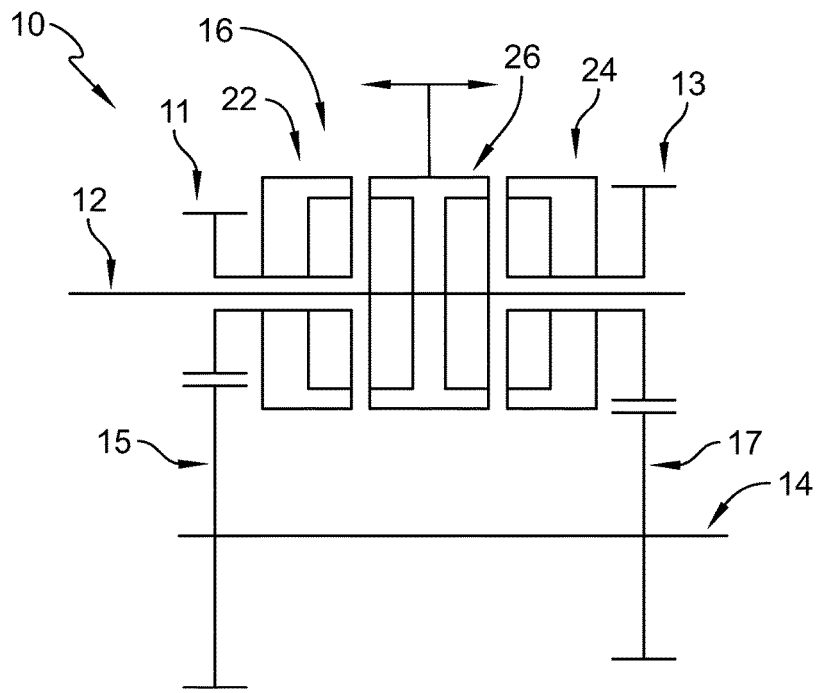
FIG. 15 is a simplified diagrammatic view of the transmission of FIG. 1.
Figure 16:
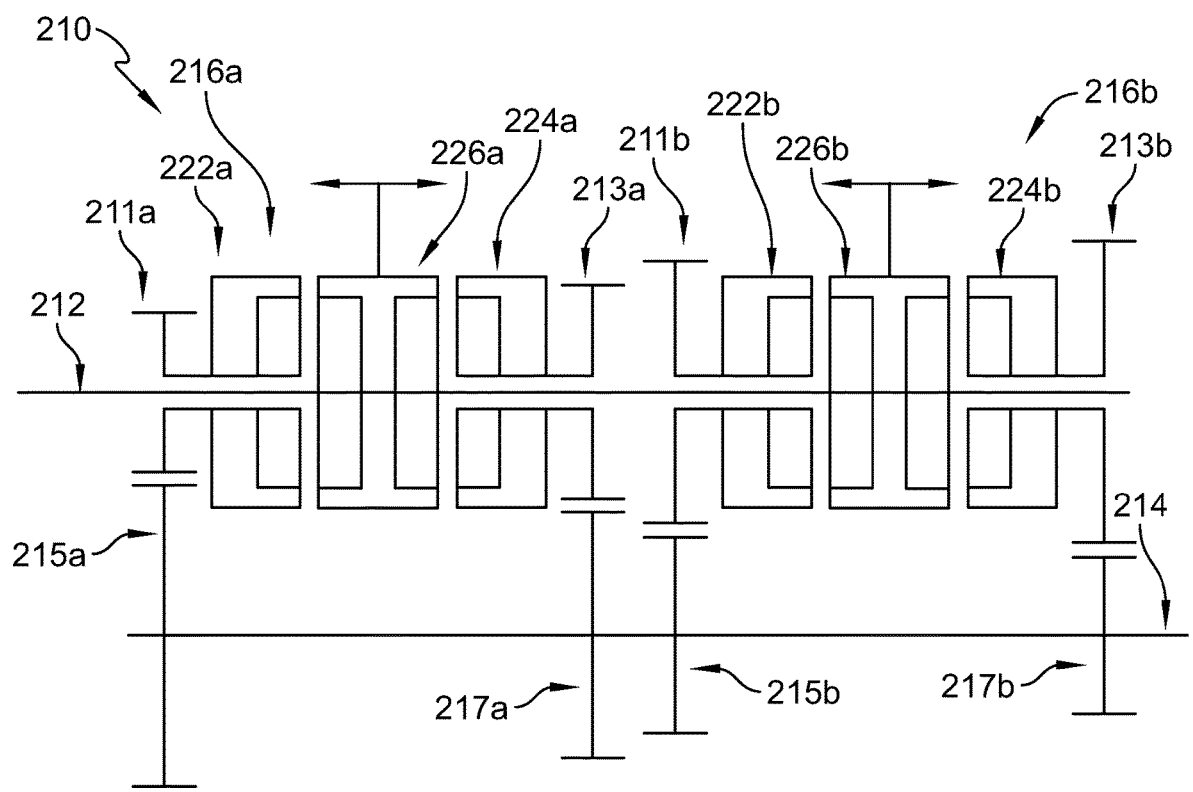
FIG. 16 is a simplified diagrammatic view of another embodiment of a transmission in accordance with the present disclosure showing that the transmission includes two sets of input gears with associated clutch arrangements for selecting an input gear to transfer rotation from the input shaft to the output shaft.

A simplified diagram of the transmission 10 is shown in FIG. 15. The transmission 10 illustratively includes two input gears 11, 13 and a single clutch arrangement 16 for selectively driving the input gears 11, 13. In another illustrative embodiment, a transmission 210 includes four input gears 211a, 211b, 213a, 213b with four associated output gears 215a, 215b, 217a, 217b arranged along an output shaft 214 as shown in FIG. 16. Two clutch arrangements 216a, 216b are used to selectively drive the input gears 211a, 211b, 213a, 213b similar to the clutch arrangement 16 of the transmission 10 described above. In the illustrative embodiment, an input shaft 212 of the transmission 210 rotates two input-gear selectors 226a, 226b of the two clutch arrangements 216a, 216b. The input-gear selectors 226a, 226b are configured to move along the input shaft 212 for engagement with couplers 222a, 222b, 224a, 224b for selectively driving the input gears 211a, 211b, 213a, 213b similar to the input-gear selector 26 and couplers 22, 24 of transmission 10 described above. Further gear sets and clutch arrangements can be added in similar fashion.

Figure 17:
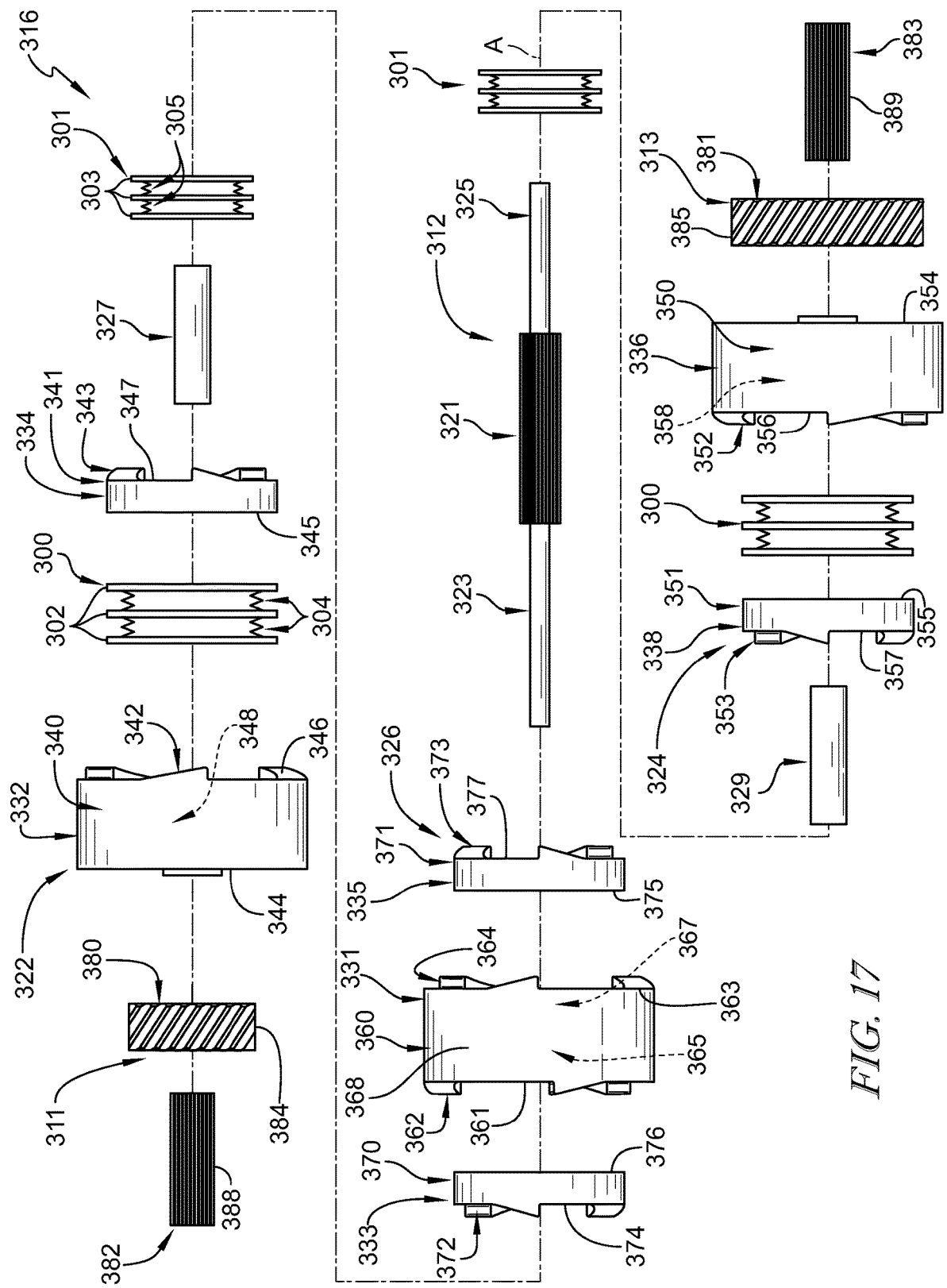
FIG. 17 is an exploded assembly view of another embodiment of a clutch arrangement in accordance with the present disclosure.

Another illustrative embodiment of a clutch arrangement 316 is illustratively shown in FIG. 17. The clutch arrangement 316 is similar to the clutch arrangement 16 of the transmission 10 with similar numbers in the 300's used to identify similar components. One difference between the clutch arrangement 316 and the clutch arrangement 16 is that the first input gear 311 and second input gear 313 do not include a stub shaft. Instead, the first input gear 311 and the first coupler 322 are mounted on a tube 382 having an anti-rotation feature, such as splines 388, for engagement with a corresponding anti-rotation feature of bores through the first input gear 311 and first coupler 322 such that the first input gear 311 and first coupler 322 rotate together. Likewise, the second input gear 313 and the second coupler 324 are mounted on a tube 383 having an anti-rotation feature, such as splines 389, for engagement with a corresponding anti-rotation feature of bores through the second input gear 313 and second coupler 324 such that the second input gear 313 and second coupler 324 rotate together.

The smooth transition of torque from one input gear to another input gear is difficult when the drive unit is an electric motor because, generally, a torque converter is not used with the associated transmission having the input gears. The clutch arrangements 16, 216, 316 of the present disclosure provide a smooth transition of torque between various input gears even when used with an electric motor. The clutch arrangements 16, 216, 316 of the present disclosure also allow for the continuous application of torque during transition from one input gear to another. The clutch arrangements 16, 216, 316 of the present disclosure further allow for the simple axial (linear) actuation of the input-gear selectors that moves multiple hubs together without complicated coordination or separate actuation of the hubs. This will enable a simpler design, easier manufacture, more adaptability to existing gearing arrangements, and simpler control and actuation.

In illustrative embodiments, teeth are formed directly onto the input gears for engagement with the teeth of the input-gear selector.

In illustrative embodiments, teeth are formed on separate couplers that are engaged with the input gears to rotate with the input gears, making the size of the input gears independent of the size of the couplers. The teeth of the coupler engage with teeth of the input-gear selector.

In illustrative embodiments, the outer hub of the input-gear selector is formed to include cavities sized to receive the inner hubs and allow movement of the inner hubs toward one another against the bias of a spring when the input-gear selector is engaging one of the couplers.

The invention claimed is:

1. A transmission comprising:
an input shaft arranged for rotation about an axis, a first input gear, a second input gear, a third input gear, and a fourth input gear coupled to the input shaft for rotation relative to the input shaft about the axis;
an output shaft spaced apart from the input shaft, first, second, third, and fourth output gears coupled to the output shaft and each engaged with a respective one of the first, second, third, or fourth input gears;
a first clutch arrangement comprising a first input-gear selector mounted for rotation with the input shaft and positioned between the first and second input gears; and
a second clutch arrangement comprising a second input-gear selector mounted for rotation with the input shaft and positioned between the third and fourth input gears;
wherein the first input-gear selector is movable on the input shaft relative to the first and second input gears for selectively driving rotation of the first input gear with rotation of the input shaft in a first circumferential direction and a second circumferential direction or rotation of the second input gear with rotation of the input shaft in the first circumferential direction and the second circumferential direction; and
wherein the second input-gear selector is movable on the input shaft relative to the third and fourth input gears for selectively driving rotation of the third input gear with rotation of the input shaft in the first circumferential direction and the second circumferential direction or rotation of the fourth input gear with rotation of the input shaft in the first circumferential direction and the second circumferential direction.

2. The transmission of claim 1, further comprising:
a first actuator configured to move the first input-gear selector relative to the first and second input gears; and
a second actuator configured to move the second input-gear selector relative to the third and fourth input gears.

3. The transmission of claim 1, wherein:
the first clutch arrangement comprises:
a first coupler mounted for rotation with the first input gear, the first coupler including an outer member and an inner member; and
a second coupler mounted for rotation with the second input gear, the second coupler including an outer member and an inner member; and
the second clutch arrangement comprises:
a third coupler mounted for rotation with the third input gear, the third coupler including an outer member and an inner member; and
a fourth coupler mounted for rotation with the fourth input gear, the fourth coupler including an outer member and an inner member;
wherein engagement of the first input-gear selector with the first coupler drives rotation of the first input gear with rotation of the input shaft, and engagement of the first input-gear selector with the second coupler drives rotation of the second input gear with rotation of the input shaft; and
wherein engagement of the second input-gear selector with the third coupler drives rotation of the third input gear with rotation of the input shaft, and engagement of the second input-gear selector with the fourth coupler drives rotation of the fourth input gear with rotation of the input shaft.

4. The transmission of claim 3, wherein:
the first input-gear selector includes a first outer hub, a first inner hub facing toward the first coupler, and a second inner hub facing toward the second coupler, the first and second inner hubs movable relative to the first outer hub; and
the second input-gear selector includes a second outer hub, a third inner hub facing toward the third coupler, and a fourth inner hub facing toward the fourth coupler, the third and fourth inner hubs movable relative to the second outer hub.

5. The transmission of claim 4, wherein the input-gear selector is positioned adjacent to the first coupler in a first configuration where torque applied to the input shaft in a first circumferential direction around the axis engages the first inner hub with the inner member of the first coupler to drive rotation of the first input gear with rotation of the input shaft, the outer hub and second inner hub are positioned adjacent to the second coupler while the first inner hub remains engaged with the first coupler in a second configuration where torque applied to the input shaft in the first direction drives rotation of the input-gear selector relative to the second coupler, the outer hub of the input-gear selector engages with the outer member of the second coupler in a third configuration where torque applied to the input shaft in the first direction drives rotation of the second input gear with rotation of the input shaft, and the first inner hub releases from the first coupler and moves toward the outer hub in a fourth configuration where torque applied to the input shaft in the first direction drives rotation of the input-gear selector relative to the first coupler.

6. The transmission of claim 5, wherein the second inner hub engages with the inner member of the second coupler in a fifth configuration where torque applied from the input shaft on the input-gear selector in a second circumferential direction around the axis, opposite of the first direction, controls rotation of the second input gear, the outer hub and first inner hub are positioned adjacent to the first coupler while the second inner hub remains engaged with the second coupler in a sixth configuration where torque applied from the input shaft on the input-gear selector in the second direction drives rotation of the input-gear selector relative to the first coupler, the outer hub of the input-gear selector engages with the outer member of the first coupler in a seventh configuration where torque applied from the input shaft on the input-gear selector in the second direction controls rotation of the first input gear, and the second inner hub releases from the second coupler and moves toward the outer hub in an eighth configuration where torque applied from the input shaft on the input-gear selector in the second direction drives rotation of the input-gear selector relative to the second coupler.

7. The transmission of claim 4, further comprising a plurality of ramped teeth extending from the first coupler toward the input-gear selector, from the second coupler toward the input-gear selector, and from the input-gear selector toward each of the first and second couplers on opposing first and second sides of the input-gear selector, wherein the teeth of the first side of the input-gear selector are arranged to engage with the teeth of the first coupler, and wherein the teeth of the second side of the input-gear selector are arranged to engage with the teeth of the second coupler.

8. The transmission of claim 7, wherein each tooth of the plurality of teeth includes an engaging face configured to engage with the engaging face of a corresponding tooth to block movement of the teeth past one another with relative rotation therebetween and a ramped surface configured to ride along the ramped surface of a corresponding tooth to allow the teeth to move past one another with relative rotation therebetween.

9. The transmission of claim 7, wherein the inner member of the first coupler is movable along the input shaft relative to the outer member of the first coupler, and wherein the inner member of the second coupler is movable along the input shaft relative to the outer member of the second coupler.

10. A transmission comprising:
an input shaft arranged for rotation about an axis, a first splined tube and a second splined tube coupled to the input shaft for rotation relative to the input shaft about the axis, a first input gear mounted on the first splined tube and a second input gear mounted on the second splined tube;
an output shaft spaced apart from the input shaft, first and second output gears coupled to the output shaft and each of the first and second output gears engaged with a respective one of the first or second input gears; and
a clutch arrangement comprising:
a first coupler mounted on the first splined tube for rotation with the first input gear, the first coupler including an outer member and an inner member;
a second coupler mounted on the second splined tube for rotation with the second input gear, the second coupler including an outer member and an inner member; and
an input-gear selector mounted for rotation with the input shaft and positioned between the first and second couplers, the input-gear selector including an outer hub, a first inner hub facing toward the first coupler, and a second inner hub facing toward the second coupler, the first and second inner hubs movable relative to the outer hub,
wherein the input-gear selector is movable on the input shaft relative to the first and second couplers, engagement of the input-gear selector with the first coupler drives rotation of the first input gear with rotation of the input shaft, and engagement of the input-gear selector with the second coupler drives rotation of the second input gear with rotation of the input shaft.

11. The transmission of claim 10, wherein the input-gear selector is positioned adjacent to the first coupler in a first configuration where torque applied to the input shaft in a first circumferential direction around the axis engages the first inner hub with the inner member of the first coupler to drive rotation of the first input gear with rotation of the input shaft, the outer hub and second inner hub are positioned adjacent to the second coupler while the first inner hub remains engaged with the first coupler in a second configuration where torque applied to the input shaft in the first direction drives rotation of the input-gear selector relative to the second coupler, the outer hub of the input-gear selector engages with the outer member of the second coupler in a third configuration where torque applied to the input shaft in the first direction drives rotation of the second input gear with rotation of the input shaft, and the first inner hub releases from the first coupler and moves toward the outer hub in a fourth configuration where torque applied to the input shaft in the first direction drives rotation of the input-gear selector relative to the first coupler.

12. The transmission of claim 11, wherein the second inner hub engages with the inner member of the second coupler in a fifth configuration where torque applied from the input shaft on the input-gear selector in a second circumferential direction around the axis, opposite of the first direction, controls rotation of the second input gear, the outer hub and first inner hub are positioned adjacent to the first coupler while the second inner hub remains engaged with the second coupler in a sixth configuration where torque applied from the input shaft on the input-gear selector in the second direction drives rotation of the input-gear selector relative to the first coupler, the outer hub of the input-gear selector engages with the outer member of the first coupler in a seventh configuration where torque applied from the input shaft on the input-gear selector in the second direction controls rotation of the first input gear, and the second inner hub releases from the second coupler and moves toward the outer hub in an eighth configuration where torque applied from the input shaft on the input-gear selector in the second direction drives rotation of the input-gear selector relative to the second coupler.

13. The transmission of claim 10, wherein movement of the outer hub of the input-gear selector toward the first coupler forces movement of the first inner hub toward the first coupler, and wherein movement of the outer hub toward the second coupler forces movement of the second inner hub toward the second coupler.

14. The transmission of claim 13, further comprising an actuator configured to move the outer hub of the input-gear selector relative to the first and second couplers.

15. The transmission of claim 10, further comprising a plurality of ramped teeth extending from the first coupler toward the input-gear selector, from the second coupler toward the input-gear selector, and from the input-gear selector toward each of the first and second couplers on opposing first and second sides of the input-gear selector, wherein the teeth of the first side of the input-gear selector are arranged to engage with the teeth of the first coupler, and wherein the teeth of the second side of the input-gear selector are arranged to engage with the teeth of the second coupler.

16. The transmission of claim 15, wherein each tooth of the plurality of teeth includes an engaging face configured to engage with the engaging face of a corresponding tooth to block movement of the teeth past one another with relative rotation therebetween and a ramped surface configured to ride along the ramped surface of a corresponding tooth to allow the teeth to move past one another with relative rotation therebetween.

17. The transmission of claim 16, wherein the engaging faces of the teeth on the outer member of the first coupler, the first inner hub, the second side of the outer hub, and the inner member of the second coupler are arranged toward the first direction, and wherein the engaging faces of the teeth on the inner member of the first coupler, the first side of the outer hub, the second inner hub, and the outer member of the second coupler are arranged toward the second direction.

18. The transmission of claim 15, wherein the inner member of the first coupler is movable along the input shaft relative to the outer member of the first coupler, and wherein the inner member of the second coupler is movable along the input shaft relative to the outer member of the second coupler.

19. The transmission of claim 18, wherein each of the first and second couplers further include a first biasing element positioned between the inner and outer members thereof and a second biasing element positioned between the inner member thereof and the input-gear selector, the first biasing elements configured to bias the inner member away from the outer member of the respective first or second coupler, and the second biasing elements configured to bias the first and second inner hubs away from the respective first or second coupler.

20. The transmission of claim 10, wherein the first input and output gear together providing a lower drive ratio than the second input and output gear together.

\* \* \* \* \*